(12) United States Patent
Lippincott

(10) Patent No.: US 6,947,604 B2
(45) Date of Patent: Sep. 20, 2005

(54) METHOD AND HARDWARE TO IMPLEMENT TWO-DIMENSIONAL COMPRESSION

(75) Inventor: Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 615 days.

(21) Appl. No.: 10/053,081

(22) Filed: Jan. 17, 2002

(65) Prior Publication Data

US 2003/0133616 A1 Jul. 17, 2003

(51) Int. Cl.$^7$ ............................. G06K 9/36; H04N 1/32
(52) U.S. Cl. ................................. 382/237; 358/426.16
(58) Field of Search ....................... 382/232, 237, 382/245–246; 358/426.07, 426.16

(56) References Cited

U.S. PATENT DOCUMENTS

| | | | | |
|---|---|---|---|---|
| 4,571,634 A | * | 2/1986 | Caneschi et al. | 358/426.07 |
| 4,800,441 A | * | 1/1989 | Sato | 358/426.12 |
| 4,809,081 A | * | 2/1989 | Linehan | 382/233 |
| 4,965,677 A | * | 10/1990 | Pennebaker et al. | 358/426.16 |
| 5,067,023 A | * | 11/1991 | Kim | 382/166 |
| 5,293,251 A | * | 3/1994 | Corcoran et al. | 358/426.14 |
| 5,369,500 A | * | 11/1994 | Jacobs | 358/406 |

* cited by examiner

Primary Examiner—Kanjibhai Patel
(74) Attorney, Agent, or Firm—Michael J. Nesheiwat

(57) ABSTRACT

Embodiments are disclosed in which two-dimensional image compression, such as for bi-level images, is implemented.

5 Claims, 5 Drawing Sheets

US 6,947,604 B2

METHOD AND HARDWARE TO IMPLEMENT TWO-DIMENSIONAL COMPRESSION

BACKGROUND

The disclosure is related to two-dimensional image compression.

A wide variety of document imaging equipment utilize compression techniques for coding bi-level document images. For example, a facsimile machine scans a document line by line and converts each line to black and white dots. The resulting document image is referred to as bi-level because a single bit represents a pixel and its value may be either 0 to represent a black dot, or 1 to represent a white dot or pixel. A combination of run-length encoding and modified Huffman coding has been found suitable to compress such bi-level images. The International Telecommunications Union (ITU, formerly known as Consultative Committee on International Telephone and Telegraph—CCITT) has, therefore, provided a number of standards or specifications suitable to compressing such bi-level facsimile images. See, for example, Hunter, et. al., International Digital Facsimile Coding Standards, Proceedings of the IEEE Vol. 68, No. 7, July 1980, pages 854–857.

The CCITT Group 4 is one such standard and applies to digital facsimile or "fax" machines. The recommendations for Group 4 include a two dimensional coding scheme. In the two dimensional scheme, the coding of each scan line is performed based, at least in part, on the previous scan line, referred to as a reference scan line. Although this standard was recommended for facsimile machines, the approach is also suitable for coding bi-level document images in various other applications, such as, for example, in photocopying machines, scanners, etc.

In photocopying or facsimile systems, the performance of the system may be measured in terms of the number of pages copied per minute. It is difficult to specify copying time per page because this time may vary with the content of the page. However, improving the encoding rate to achieve a higher number of pages per minute is desirable in order to improve performance.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

As previously described, the ITU has provided a specification or standard known as CCITT Group 4 that is employed to compress bi-level facsimile images (hereinafter also referred to as "G4"). Although this standard was recommended for facsimile machines, the approach is also suitable for coding bi-level document imaging applications, such as, for example, in photocopying machines, scanners, etc. The encoding rate may be improved, for example, by implementing high-speed look-ahead circuits designed to exploit features of the compression approach employed, as described in more detail hereinafter.

In one aspect, the claimed subject matter increases compression efficiency by reading a predetermined number of look-ahead bits of the bit stream, and bypassing the compression of the look-ahead bits if they all have the same binary value. For example, in one embodiment, bypassing the compression of the look-ahead bits is based at least in part on if all the bits have the same binary value string of logic ones or logic zeros, or both.

Figure 1:
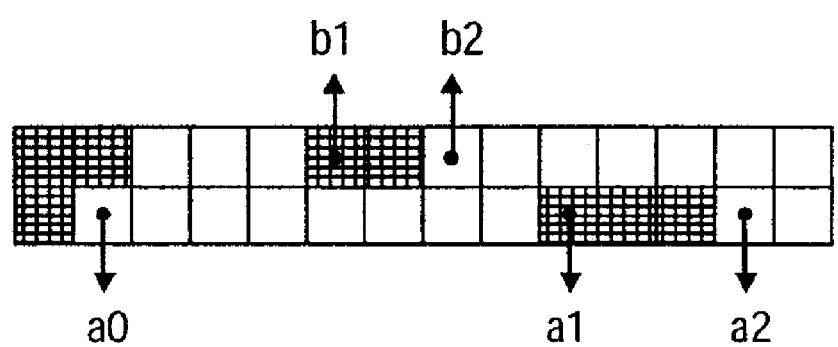
FIG. 1 is a schematic diagram of a portion of a reference scan line and a portion of a scan line to be coded, to illustrate definitions employed in CCITT Group 4 bi-level image compression in accordance with one embodiment.

FIG. 1 is a schematic diagram of a two dimensional bit stream employed to illustrate commonly used definitions that apply to the CCITT Group 4 standard for two-dimensional bi-level image compression. As illustrated, five positions, denoted a0, a1, a2, b1, and b2, are shown. Of course, these positions are merely provided for illustrative purposes and do not limit the scope of the claimed subject matter. These positions may have the following designations:

a0 indicates the position of a first pixel of a new code word in the coding line, and may be black or white, as shown in FIG. 1;

a1 indicates a position of the first pixel to the right of a0 in the coding line with a different color, as shown in FIG. 1;

a2 indicates a position of the first pixel to the right of a1 in the coding line with a different color, as shown in FIG. 1;

b1 indicates a position of the first pixel in the reference line to the right of a0 with a different color, as shown in FIG. 1; and b2 indicates a position of the first pixel in the reference line to the right of b1 with a different color, as shown in FIG. 1.

Figure 2:
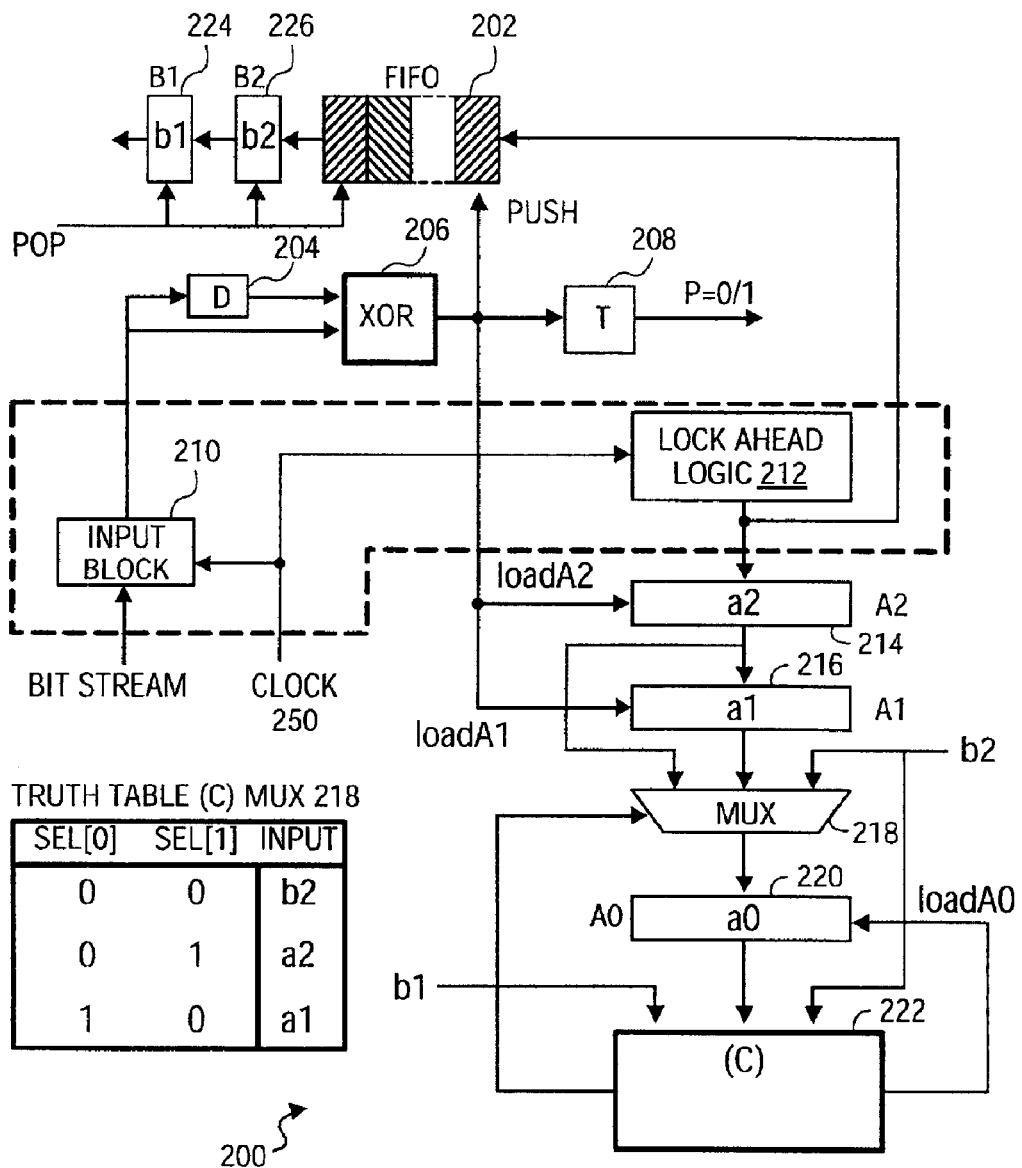
FIG. 2 is a schematic diagram illustrating an embodiment of a circuit to implement two-dimensional compression.

FIG. 2 is a schematic diagram illustrating an embodiment of a circuit to implement two-dimensional compression. In one embodiment, schematic 200 is implemented on an integrated circuit (IC) chip. However, this is just one illustrative example. For example, in another embodiment, schematic 200 may be implemented within a system on a chip (SoC).

Although the scope of the claimed subject matter is not limited in this respect, it is noted that some embodiments may further include subject matter from the following filed application: U.S. application Ser. No. of 09/664,121, and titled "TECHNIQUES TO IMPLEMENT TWO-DIMENSIONAL COMPRESSION", by Tinku Acharya.

As illustrated in FIG. 2, embodiment 200 includes digital logic circuitry, including, in this particular embodiment, registers, counters, logic, and combinational logic. For example, again, this is just one example, 202 comprises a first in first out (FIFO) buffer; 214, 216, 220, 224, and 226 comprise registers; 218 comprises a multiplexer; and 210 comprises an input block. Likewise, other examples of the digital logic circuitry include XOR circuit 206, toggle switch 208, look-ahead logic 212, delay element 204, clock 250, and a circuit C 222. The look-ahead logic and input block are discussed in further detail in connection with FIG. 3. However, the claimed subject matter is not limited in scope to this particular digital logic circuitry and digital memories or to this particular configuration of such components. Nonetheless, as shall be explained in more detail hereinafter, in this embodiment, the digital memories and digital logic circuitry are coupled so as to implement two dimensional compression of a two dimensional bit stream depicted in FIG. 1 to be applied to the digital logic circuitry and digital memories.

Referring now to FIG. 1, when a bit stream is applied to this particular embodiment of a circuit to two-dimensional compression, here embodiment 200, the following operation occurs. On successive pulses of a clock, such as clock 250, a successive bit of the bit stream is applied to input block 210. In one embodiment, clock 250 comprises an externally derived clock. However, the claimed subject matter is not necessarily limited in scope in this respect. As clock 250 applies successive pulses, that bit of the bit stream is applied to XOR circuit 206. Likewise, however, the bits are also applied to delay element 204. In one embodiment, the delay element is a D flip-flop and the bit is delayed by one clock cycle. Therefore, in this embodiment, XOR circuit 206 is employed to compare two consecutive bits of the bit stream, the current bit applied to the input block 210 with the previous bit delayed by one clock cycle at delay element 204.

The XOR circuit 206 facilitates comparing two consecutive bits in the bit stream to determine whether the two bits have the same value. For example, in this embodiment, if the two bits of the bit stream compared by XOR circuit 206 are the same, circuit 206 produces a "0" output signal. However, once an input bit is received having a binary value different than the immediately previous bit, the circuit provides a "1" output signal. Therefore, 206, in this particular embodiment, indicates the end of a run of pixels of a particular color, here, either black or white. The output signal of 206 is applied to toggle switch 208. In this particular embodiment, the toggle switch is implemented also using a flip-flop, referred to as a Toggle or T flip-flop. The output signal of 208 is toggled when an output signal from 206 applied to 208 comprises a "1." In this particular embodiment, 206 and 208 are initialized to "1" to indicate that initially the runs comprise white pixels, although, this is merely a convention employed for convenience, and an alternative embodiment having a different initialization may be employed. Therefore, when toggle switch 208 toggles to "0," this indicates the end of a run of white pixels and the beginning of a run of black pixels. The output signals of toggle switch 208 remain "0" until the end of the run of black pixels is detected, as indicated by the output signal of 206, in which case toggle switch 208 toggles back to "1." Therefore, in this embodiment, in addition to signaling the end of a run of pixels of a particular color, toggle switch 208 also signals the color of the run, in this embodiment, 0 for a black run, and 1 for a white run, although, of course, the claimed subject matter is not limited in scope in this respect.

In this particular embodiment, look-ahead logic 212 comprises two counters, although, of course, the claimed subject matter is not limited in scope in this respect. The two counters, which are discussed in further detail in connection with FIG. 3, count the length of the run of a particular color. At the end of the run, that is, in this embodiment, when the output signal of 206 is "1," both counters are reset to "0." When the run ends, the length of the run is the output signal, Run Count. In this particular embodiment, Run Count is loaded into register 214 by application of the output signal of XOR circuit 206 to register 214. This indicates the position of a2 in the scan line, which is loaded into register 214. In response to the output signal of XOR circuit 206, the previous contents of register 214 are loaded into register 216, indicating the position of a1 in the scan line.

As FIG. 2 illustrates, register 220 stores the current position of a0. However, as illustrated by the truth table for multiplexer 218, this may comprise any one of the values a1, a2, and b2, based at least in part, on the applicable mode. In FIG. 2, multiplexer 218 implements one example of a mode selection technique, based at least in part, on the specific values of control signals SEL(0) and SEL(1) applied to the multiplexer. Also, FIG. 2 illustrates that circuit C 222 generates the control signals.

One aspect of this particular embodiment is the use of first in first out (FIFO) register 202. This conserves resources in terms of circuit complexity, memory, and speed. Instead of storing an entire reference scan line, specific position locations, such as b1 and b2, are stored. Therefore, at the beginning of encoding the coding line, the FIFO stores the positions of the end of successive color runs in the current reference scan line. As encoding takes place, lookahead logic 212 indicates the position of the end of a color run in the coding line once XOR circuit 206 produces a "1" output signal. When this occurs, which will be discussed further in connection with FIG. 3, for this embodiment, a value from one of a plurality of counters in look-ahead logic 212 is "pushed" into FIFO 202 using control signal "PUSH," which, in this particular embodiment, is the output signal produced by XOR 206. Thus, another position of the end of a color run in the coding line is stored when successive bits from the coding line being input to be coded change state. With this approach, the first two values or elements stored in FIFO 202 at any particular time comprise two consecutive positions of two consecutive ends of color runs in the reference line. Likewise, FIFO buffer 202 is advanced when a value is loaded into register 220. As described in more detail below, this generally signals that a code word to be output is generated. As illustrated in FIG. 2, control signal "POP" is applied and the first entry of FIFO 202 is loaded into register 226, indicating the value of b2. Likewise, the previous contents of register 226 are loaded into register 224, indicating the current value of b1. The look-ahead logic 212 is discussed in further detail in connection with FIG. 3 below.

Figure 3:
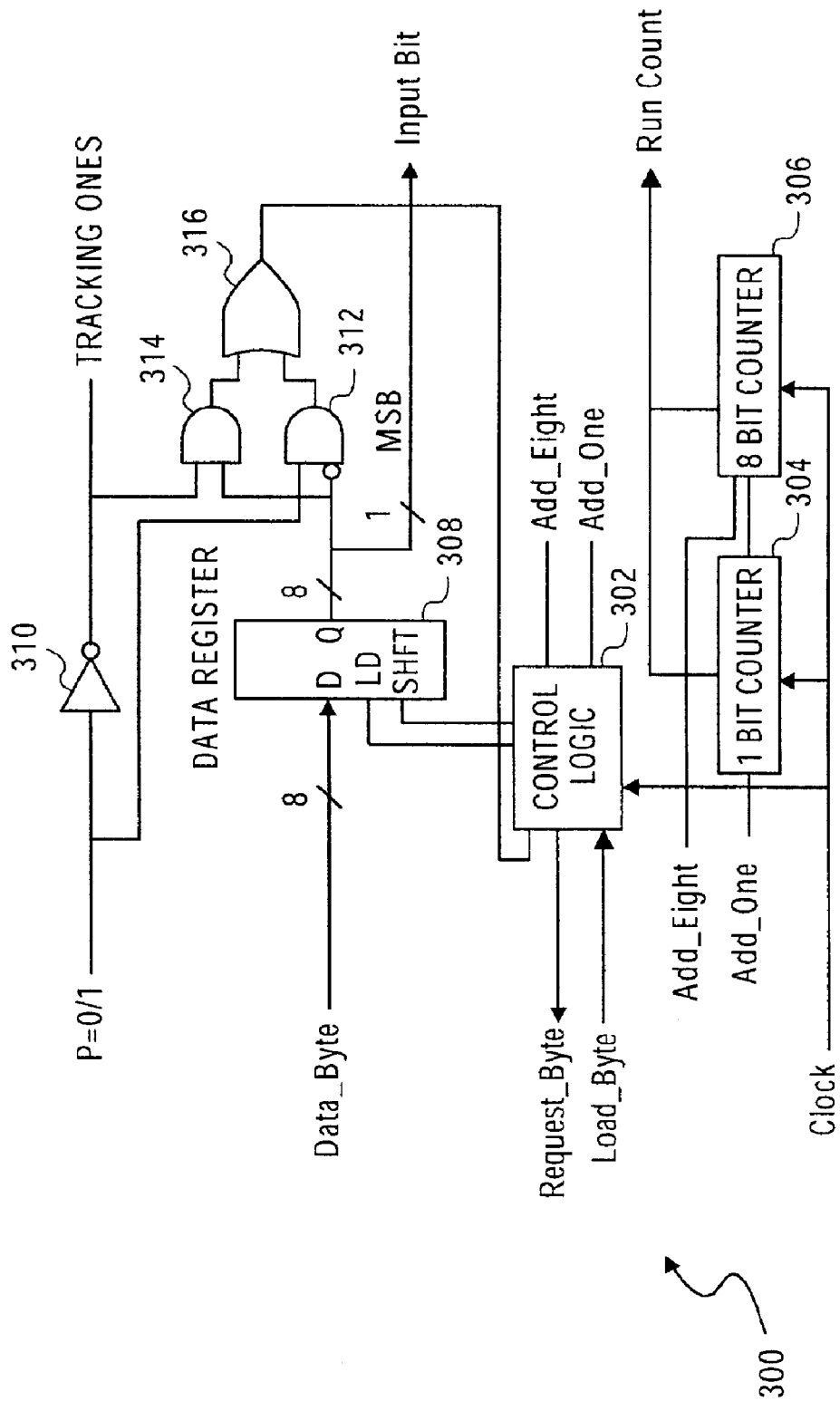
FIG. 3 is a schematic diagram illustrating a portion of the embodiment of FIG. 2 in more detail.

FIG. 3 is a schematic diagram illustrating a portion of FIG. 2 in more detail, specifically, the look-ahead logic 212 and the input block 210. In one embodiment, the look-ahead logic 212 comprises the following elements in FIG. 3: a control logic 302, a first counter 304, a second counter 306, and a plurality of combinational logic 310, 312, 314, and 316. In the same embodiment, the input block 210 comprises the following element of FIG. 3: a data register 308. However, the claimed subject matter is not limited in scope to this particular digital logic circuitry or to this particular configuration of such components. Nonetheless, as shall be explained in more detail hereinafter, in this embodiment, the digital memories and digital logic circuitry are coupled so as to implement two-dimensional compression of a bit stream to be applied to the digital logic circuitry and digital memories.

The schematic depicted in FIG. 3 facilitates efficient compression. For example, rather than compressing every bit of the bit stream received by the data register 308, the schematic, by "looking ahead" of the current bit which has been compressed, reads a portion of the bit stream and detects if the look-ahead bits have the same binary value. As one example, the schematic stores a predetermined number of bits of the bit stream, the "look-ahead bits", in the data register 308. In one embodiment, the look-ahead or predetermined number of bits is a byte (eight bits). However, the claimed subject matter is not limited in scope to only storing a byte. For example, the claimed subject matter may support storing a plurality of bit sizes ranging from only one to several bytes by incorporating a smaller or larger data register 308. In one embodiment, the combination logic 310, 312, 314, and 316, detect whether all the bits in the byte stored in the data register have the same binary value.

In this embodiment, control logic 302 generates a signal, Request_Byte, which initiates a load operation of a byte from the bit stream depicted in FIG. 1. Upon receiving the Load_Byte signal, the data register stores the byte. However, the claimed subject matter is not limited to a byte, since the claimed subject matter can support storing a few bits or several bytes by incorporating a different size for the data register 308. As previously discussed, the combination logic 310, 312, 314, and 316 detects whether all the bits in the byte stored in the data register have the same binary value. Therefore, the claimed subject matter increases encoding efficiency by bypassing the compression of the look-ahead bits in one clock cycle when there are no changes in the image level, and in some instances allows for increased compression performance of eight fold.

In one embodiment, if the look-ahead bits are all zeroes or all ones, the control logic enables the Add_Eight signal to initiate an increment of eight to the eight-bit counter 306. Of course, in other embodiments, other increments may be employed. Otherwise, the most significant bit (MSB) of the data register is shifted out and the Add_One signal initiates an increment of one to the counter 304. The Run Count signal indicates the position of the bit stream, based at least in part, on the values of the counters 304 and 306.

Continuing on with FIG. 3, combinational logic 310, 312, 314, and 316 illustrates an embodiment for detecting a signature of all zeroes or all ones of a byte. For example, in this particular embodiment, the data byte is coupled to a first and second eight input AND gates, 312 and 314. The inputs of the AND gate 314 receive the data byte, however, the inputs of the AND gate 312 receive an inverted version of the data byte. The P=0/1 signal and the inverter 310 enable AND gate 312 or 314. For example, in this particular embodiment, when P=0/1 is high, this enables the AND gate 312 to detect if the data byte, the predetermined number of bits, all have a binary value of zero. Thus, if the data byte is all zeros, then the output signal, SKIP, of the OR gate 316 is active and indicates that the data byte may be skipped over and counted as eight zeros. Alternatively, when P=0/1 is low, this enables the AND gate 314 to detect if the data byte, the predetermined number of bits, all have a binary value of one. Thus, if the data byte is all ones, then the output signal, SKIP, of the OR gate 316 is active and indicates that the entire data byte can be skipped over and counted as eight ones. However, the claimed subject matter is not limited in this respect to eight bits. For example, the combinational logic may be configured to detect different signatures such as "11001100" with minor modifications to the AND gates 312 and 314. Another example is detecting the presence of a signature for different number of bits, rather than only eight. For example, the data register 308 may be modified to store different bit size configurations to allow for a few bits or several bytes or more.

Figure 4:
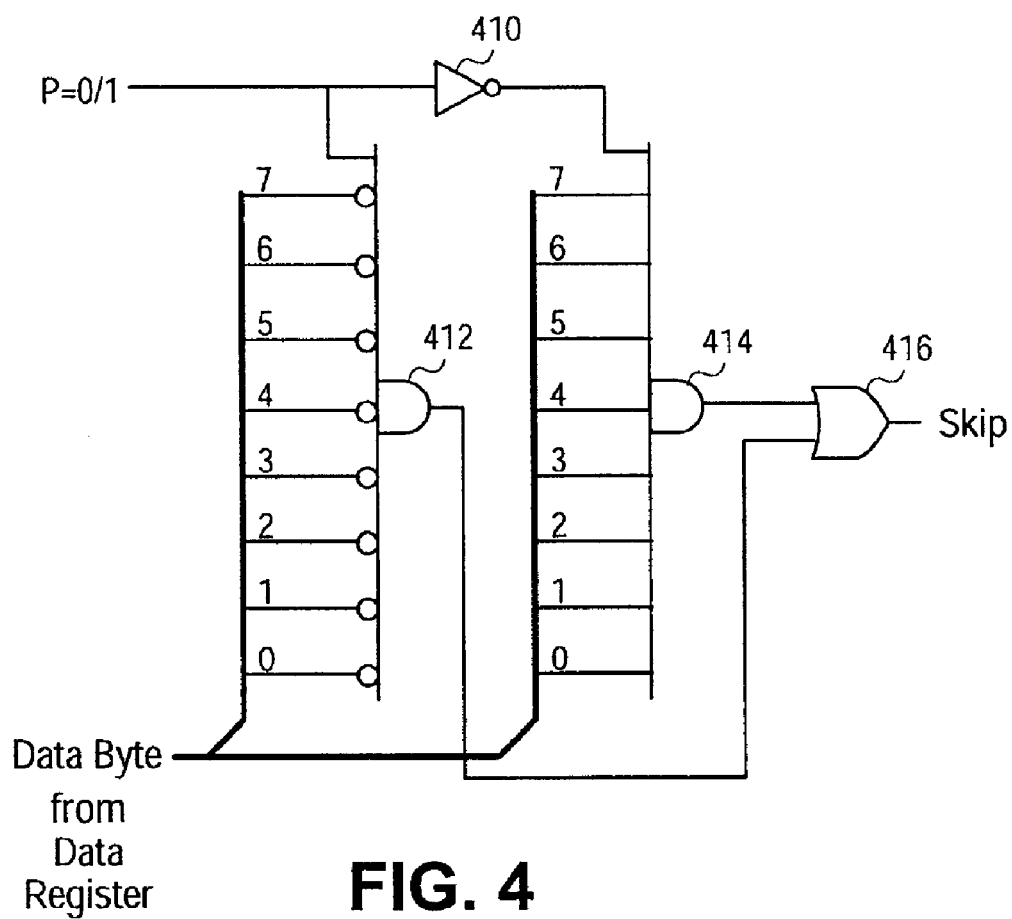
FIG. 4 is a schematic diagram illustrating a portion of the embodiment of FIG. 3 in more detail.

FIG. 4 is a schematic diagram illustrating a portion of FIG. 3 in more detail, specifically, FIG. 4 illustrates in further detail the AND gates 312 and 314 of FIG. 3. In one embodiment, the AND gate 414 receives the byte from data register 308. In contrast, the AND gate 412 receives a logical complement of the byte from data register 308. The operation of inverter 410 and OR gate 416 is similar to the previously described operation of inverter 310 and OR gate 316.

Figure 5:
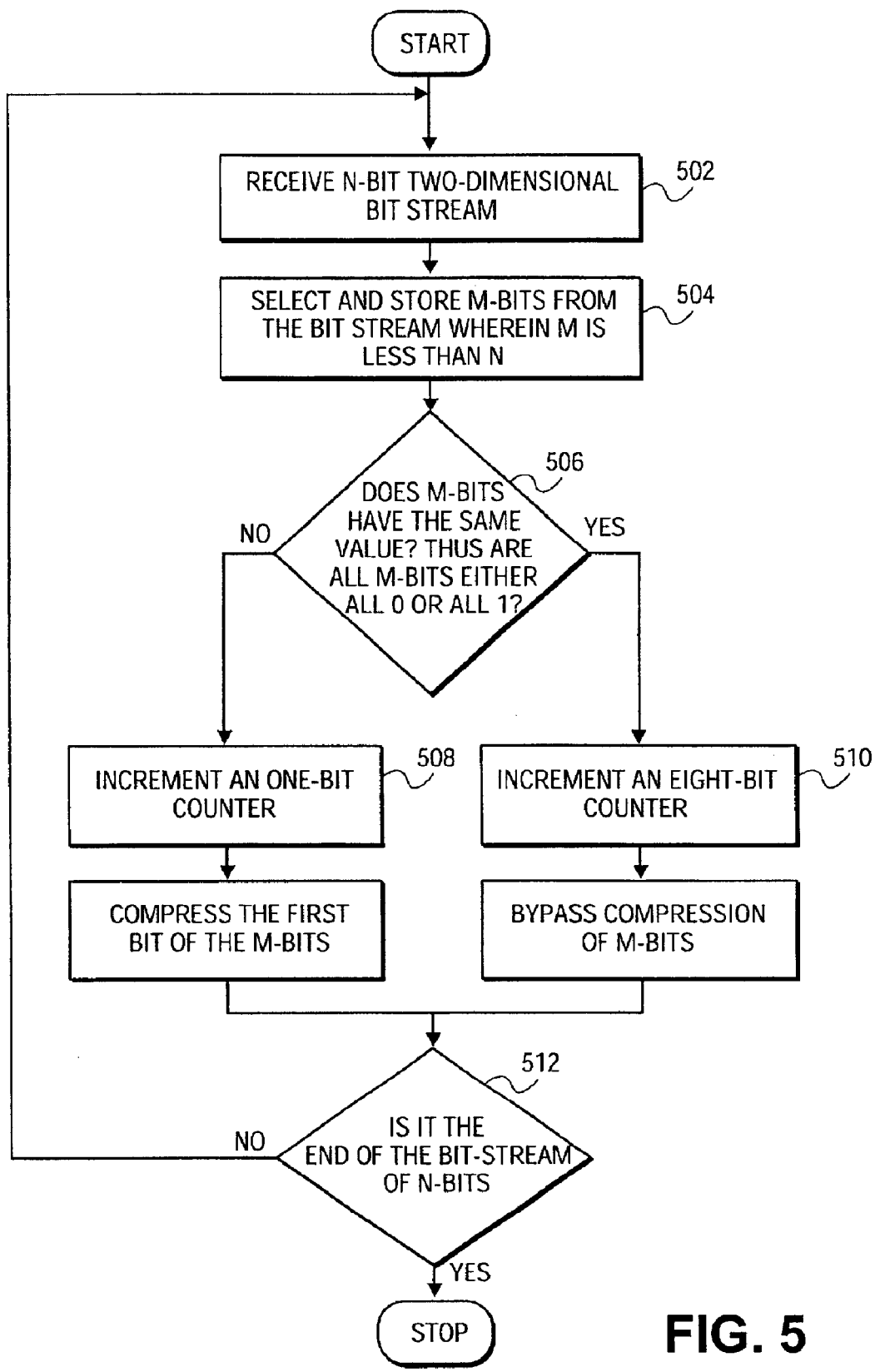
FIG. 5 is a flowchart illustrating an embodiment of a method to implement two-dimensional compression.

FIG. 5 illustrates a flowchart in accordance with an embodiment. The flowchart illustrates merely one example of a method of efficient compression by detecting whether a predetermined number of look-ahead bits have the same binary values of all zeroes or all ones. A block 502 receives an n-bit two-dimensional bit stream. In one embodiment, the bit stream is similar to the bit stream depicted in FIG. 1. A block 504 selects and stores m bits from the bit stream, wherein m is less than n. In one embodiment, the m bits represent the predetermined number of look-ahead bits selected by the control logic 302 and which are stored in the data register 308. A decision block 506 determines whether the m bits have binary values of all zeroes or all ones. In one embodiment, this decision is performed by the combinational logic 310, 312, 314, and 316. If the decision block 506 is a yes, which is the condition that the m bits have binary values that are either all zero or all one, then path 510 is followed and results in incrementing an eight-bit counter and bypassing the compression of the m bits. Otherwise, if the decision block 506 is a no, which is the condition that the m bits do not have binary values that are either all zero or all one, then path 508 is followed and results in incrementing an one-bit counter and compressing the most significant bit of the m bits. However, the flowchart is not limited to the previous embodiment. For example, different increments and counters may be employed. Likewise, more decisions and blocks may be employed in the flowchart.

A decision block 512 determines whether the end of the bit stream has been reached. In one embodiment, the end of the bit stream is determined by the Run Count signal generated from the counters 304 and 306 depicted in FIG. 3. If the decision of block 512 results in a "no" condition, which indicates the end of the bit stream has not been reached, then the flowchart is repeated, starting with block 502. Otherwise, the flowchart concludes with a stop.

While certain features of the claimed subject matter have been illustrated and detailed herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. A method of implementing the compression of a two dimensional bit stream comprising:

receiving the two dimensional bit stream; and determining whether a predetermined number of bits of the two-dimensional bit stream all have the same binary value;

bypassing a two dimensional compression of the predetermined number of bits if the predetermined number of bits all have the same binary value, otherwise, compressing a first bit of the predetermined number of bits, wherein the two dimensional compression complies with the CCITT Group 4 bi-level image compression standard.

2. An integrated circuit comprising:

a logic;

a register; and the logic and register being coupled so as to implement two dimensional compression of a bit stream by look-ahead of a predetermined number of bits of the bit stream, the predetermined number of bits are a subset of the two dimensional bit stream, and the logic to determine whether the predetermined number of bits all have the same binary value, wherein the logic is to bypass the two-dimensional compression of the predetermined number of bits if the predetermined number of bits all have the same binary value, otherwise, the logic to compress a first bit of the predetermined number of bits, wherein said two dimensional compression complies with CCITT Group 4 bi-level image compression standard.

3. A document processing system comprising:

a logic and a register, the logic and the register being coupled so as to implement two dimensional compression of a bit stream by look-ahead of a predetermined number of bits of the bit stream, the predetermined number of bits are a subset of the two dimensional bit stream, and the logic to bypass compression of the predetermined number of bits if the predetermined number of bits all have the same binary value, wherein said two-dimensional compression to be implemented complies with the CCITT Group 4 bi-level compression standard.

4. The document processing system of claim 3, wherein the logic includes a first and second binary counter, the first and second binary counter being coupled so as to calculate a run count based at least in part on whether the predetermined number of bits all have the same binary value.

5. The document processing system of claim 3, wherein the logic is to perform two-dimensional compression of a first bit of the predetermined number of bits, if the predetermined number of bits do not have the same binary value.

* * * * *